(12) United States Patent
Rembisz et al.

(10) Patent No.: US 12,030,178 B2
(45) Date of Patent: Jul. 9, 2024

(54) MOBILE ROBOT SENSOR CONFIGURATION

(71) Applicant: Google LLC, Mountain View, CA (US)

(72) Inventors: Justine Rembisz, San Carlos, CA (US); Alex Shafer, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/162,338

(22) Filed: Jan. 31, 2023

(65) Prior Publication Data

US 2023/0173695 A1    Jun. 8, 2023

Related U.S. Application Data

(63) Continuation of application No. 16/528,123, filed on Jul. 31, 2019, now Pat. No. 11,597,104.

(51) Int. Cl.
| | | |
|---|---|---|
| *G06F 17/00* | (2019.01) | |
| *B25J 13/08* | (2006.01) | |
| *B25J 19/02* | (2006.01) | |
| *G01S 7/4865* | (2020.01) | |
| *G01S 17/931* | (2020.01) | |

(52) U.S. Cl.
CPC .......... *B25J 19/022* (2013.01); *B25J 13/089* (2013.01); *B25J 19/027* (2013.01); *G01S 7/4865* (2013.01); *G01S 17/931* (2020.01)

(58) Field of Classification Search
CPC ...... B25J 19/022; B25J 13/089; B25J 19/027; B25J 5/007; B25J 9/16; B25J 9/1666; B25J 9/1694; G01S 7/4865; G01S 17/931; G01S 17/42; G01S 17/87; G01S 17/88; G01S 17/89; G05D 2201/0216; G05D 1/024

USPC .......................................................... 700/259
See application file for complete search history.

(56) References Cited

U.S. PATENT DOCUMENTS

| | | | | |
|---|---|---|---|---|
| 5,319,611 A | * | 6/1994 | Korba | G01S 7/52003 367/909 |
| 5,529,138 A | * | 6/1996 | Shaw | G01S 17/931 188/DIG. 1 |
| 5,684,695 A | * | 11/1997 | Bauer | G05D 1/0274 701/28 |
| 6,202,395 B1 | * | 3/2001 | Gramm | A01D 41/141 |

(Continued)

FOREIGN PATENT DOCUMENTS

| | | |
|---|---|---|
| CN | 1095541631 | 3/2019 |
| EP | 2775316 | 9/2014 |

(Continued)

OTHER PUBLICATIONS

Obstacle Classification and 3D Measurement (Year: 2014).*

(Continued)

*Primary Examiner* — Ronnie M Mancho
(74) *Attorney, Agent, or Firm* — McDonnell Boehnen Hulbert & Berghoff LLP

(57) ABSTRACT

A mobile robotic device is disclosed which includes a plurality of one-dimensional (1D) time-of-flight (ToF) sensors. Each 1D ToF sensor of the plurality of 1D ToF sensors may be mounted at a fixed position and orientation on the mobile robotic device. Each pair of 1D ToF sensors of the plurality of 1D ToF sensors may be fixed at respective positions and orientations relative to each other such that respective cones of coverage of the pair of 1D ToF sensors are non-overlapping.

17 Claims, 11 Drawing Sheets

(56) References Cited

U.S. PATENT DOCUMENTS

| | | | |
|---|---|---|---|
| 7,068,815 B2 | 6/2006 | Chang et al. | |
| 8,332,134 B2 | 12/2012 | Zhang et al. | |
| 8,380,350 B2* | 2/2013 | Ozick | A47L 9/0477 |
| | | | 700/250 |
| 8,442,714 B2* | 5/2013 | Matsukawa | G05D 1/0238 |
| | | | 701/28 |
| 8,880,273 B1* | 11/2014 | Chatham | G08G 1/00 |
| | | | 701/28 |
| 9,069,080 B2* | 6/2015 | Stettner | G01S 17/931 |
| 9,746,852 B1* | 8/2017 | Watts | G05D 1/0248 |
| 10,721,859 B2* | 7/2020 | Wu | A01C 21/005 |
| 11,199,853 B1* | 12/2021 | Afrouzi | G05D 1/0246 |
| 11,318,617 B2 | 5/2022 | Nakayama et al. | |
| 2005/0246065 A1 | 11/2005 | Ricard | |
| 2006/0184274 A1 | 8/2006 | Sakai et al. | |
| 2011/0266076 A1* | 11/2011 | Morey | B62D 55/06 |
| | | | 901/1 |
| 2012/0022689 A1* | 1/2012 | Kapoor | B25J 9/1666 |
| | | | 901/49 |
| 2012/0173018 A1 | 7/2012 | Allen et al. | |
| 2012/0182392 A1 | 7/2012 | Kearns et al. | |
| 2013/0226344 A1* | 8/2013 | Wong | G05D 1/024 |
| | | | 901/1 |
| 2013/0231779 A1* | 9/2013 | Purkayastha | G05D 1/0088 |
| | | | 700/258 |
| 2014/0074287 A1 | 3/2014 | Lafary et al. | |
| 2014/0324270 A1* | 10/2014 | Chan | G01S 17/931 |
| | | | 701/28 |
| 2015/0185322 A1 | 7/2015 | Haegermarck | |
| 2015/0362921 A1* | 12/2015 | Hanaoka | G05D 1/0088 |
| | | | 702/159 |
| 2016/0198144 A1* | 7/2016 | Yu | H04N 13/243 |
| | | | 348/48 |
| 2016/0270619 A1* | 9/2016 | Lu | A47L 11/4083 |
| 2017/0308086 A1* | 10/2017 | Watts | G01S 17/931 |
| 2018/0078106 A1* | 3/2018 | Scholten | G01S 17/931 |
| 2020/0180162 A1* | 6/2020 | Roziere | B25J 19/066 |
| 2020/0269782 A1 | 8/2020 | Fujihira et al. | |
| 2021/0031385 A1 | 2/2021 | Rembisz et al. | |

FOREIGN PATENT DOCUMENTS

| | | |
|---|---|---|
| JP | H05224745 A | 9/1993 |
| JP | 2003271242 A | 9/2003 |
| JP | 2004139264 A | 5/2004 |
| JP | 2004258967 | 9/2004 |
| JP | 2004280451 | 10/2004 |
| JP | 2006146376 A | 6/2006 |
| JP | 2006155374 A | 6/2006 |
| JP | 2010085284 | 4/2010 |
| JP | 2010122904 | 6/2010 |
| JP | 2011257350 | 12/2011 |
| JP | S53000529 | 9/2013 |
| JP | 2014021625 A | 2/2014 |
| JP | 2017015601 A | 1/2017 |
| WO | 2019/116793 | 6/2019 |

OTHER PUBLICATIONS

AZO Sensors, "An Introduction to the Time-0f-Flight Principle," Apr. 30, 2019, retrieved from the internet: URL: hllps://www.azosensors.com/article.aspx?Article1D=1631 [retrieved on Sep. 23, 2020], 10 pages.

Hedenberg, Klas, "Obstacle Detection for Driverless Trucks in Industrial Environments," Halmstad Univerisyt Dissertations No. 7, Halmstad University Press, 2014, 92 pages.

Kumar et al., "Sensor Fusion of Laser & Stereo Camera for Depth Estimation and Obstacle Avoidance," International Journal of Computer Applications (0975-8887), 2010, pp. 22-27, vol. 1, No. 26.

Terabee: "Introduction to TeraRanger Multiflex—Solution for mobile robotics," YouTube, May 2, 2017, retrieved from the internet: URL:https://www.youtube.com/watch?v=5FyolwwhE5M.

* cited by examiner

MOBILE ROBOT SENSOR CONFIGURATION

CROSS-REFERENCE TO RELATED DISCLOSURE

This application is a continuation of U.S. patent application Ser. No. 16/528,123, filed on Jul. 31, 2019, which is hereby incorporated herein by reference in its entirety.

BACKGROUND

As technology advances, various types of robotic devices are being created for performing a variety of functions that may assist users. Robotic devices may be used for applications involving material handling, transportation, welding, assembly, and dispensing, among others. Over time, the manner in which these robotic systems operate is becoming more intelligent, efficient, and intuitive. As robotic systems become increasingly prevalent in numerous aspects of modern life, it is desirable for robotic systems to be efficient. Therefore, a demand for efficient robotic systems has helped open up a field of innovation in actuators, movement, sensing techniques, as well as component design and assembly.

SUMMARY

An example mobile robotic device includes a plurality of one-dimensional (1D) time-of-flight (ToF) sensors for obstacle detection. The 1D ToF sensors may be mounted at fixed positions and orientations relative to each other so that their respective coverage regions are non-overlapping. This arrangement may beneficially minimize the number of necessary 1D ToF sensors by avoiding inefficient overlap in coverage while also providing a predictable upper bound on the size of objects that may be not be detected by the 1D ToF sensors.

In an embodiment, a mobile robotic device is disclosed which includes a plurality of 1D ToF sensors. Each 1D ToF sensor of the plurality of 1D ToF sensors may be mounted at a fixed position and orientation on the mobile robotic device. Each pair of 1D ToF sensors of the plurality of 1D ToF sensors may be fixed at respective positions and orientations relative to each other such that respective cones of coverage of the pair of 1D ToF sensors are non-overlapping.

In another embodiment, a method is disclosed which includes receiving sensor data from a plurality of 1D ToF sensors, where each 1D ToF sensor of the plurality of 1D ToF sensors is mounted at a fixed position and orientation on the mobile robotic device, where each pair of 1D ToF sensors of the plurality of 1D ToF sensors are fixed at respective positions and orientations relative to each other such that respective cones of coverage of the pair of 1D ToF sensors are non-overlapping. The method further includes processing the sensor data to detect one or more obstacles in an environment of the mobile robotic device. The method additionally includes navigating the mobile robotic device based on the sensor data.

In an additional embodiment, a mobile base is disclosed which includes a plurality of 1D ToF sensors. Each 1D ToF sensor of the plurality of 1D ToF sensors may be mounted at a fixed position and orientation on the mobile base. Each pair of 1D ToF sensors of the plurality of 1D ToF sensors may be fixed at respective positions and orientations relative to each other such that respective cones of coverage of the pair of 1D ToF sensors are non-overlapping.

In a further embodiment, a non-transitory computer readable medium is provided which includes programming instructions executable by at least one processor to cause the at least one processor to perform functions. The functions include receiving sensor data from a plurality of 1D ToF sensors, where each 1D ToF sensor of the plurality of 1D ToF sensors is mounted at a fixed position and orientation on the mobile robotic device, where each pair of 1D ToF sensors of the plurality of 1D ToF sensors are fixed at respective positions and orientations relative to each other such that respective cones of coverage of the pair of 1D ToF sensors are non-overlapping. The functions further include processing the sensor data to detect one or more obstacles in an environment of the mobile robotic device. The functions additionally include navigating the mobile robotic device based on the sensor data.

In another embodiment, a system is provided that includes means for receiving sensor data from a plurality of 1D ToF sensors, where each 1D ToF sensor of the plurality of 1D ToF sensors is mounted at a fixed position and orientation on the mobile robotic device, where each pair of 1D ToF sensors of the plurality of 1D ToF sensors are fixed at respective positions and orientations relative to each other such that respective cones of coverage of the pair of 1D ToF sensors are non-overlapping. The system further includes means for processing the sensor data to detect one or more obstacles in an environment of the mobile robotic device. The system additionally includes means for navigating the mobile robotic device based on the sensor data.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

DETAILED DESCRIPTION

Figure 1:
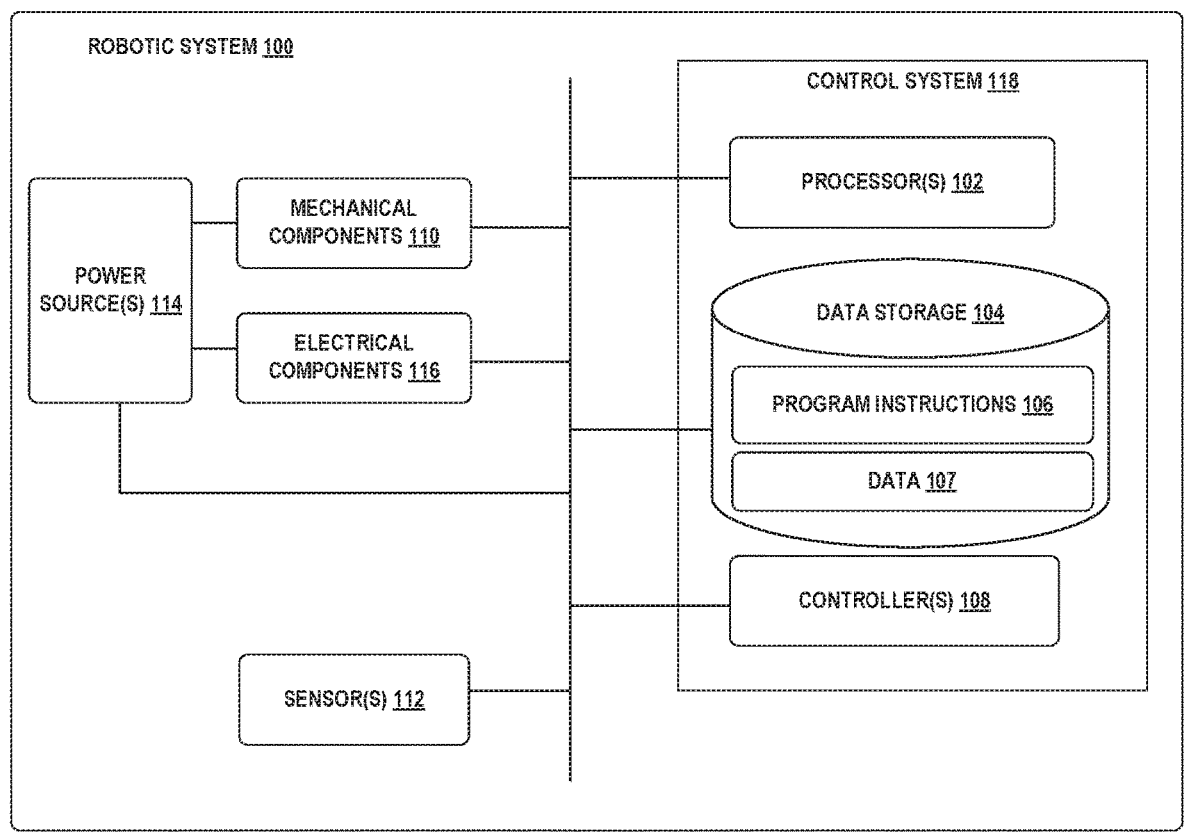
FIG. 1 illustrates a configuration of a robotic system, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless indicated as such. Other embodiments can be utilized, and other changes can be made, without departing from the scope of the subject matter presented herein.

Thus, the example embodiments described herein are not meant to be limiting. It will be readily understood that the aspects of the present disclosure, as generally described herein, and illustrated in the figures, can be arranged, substituted, combined, separated, and designed in a wide variety of different configurations.

Throughout this description, the articles "a" or "an" are used to introduce elements of the example embodiments. Any reference to "a" or "an" refers to "at least one," and any reference to "the" refers to "the at least one," unless otherwise specified, or unless the context clearly dictates otherwise. The intent of using the conjunction "or" within a described list of at least two terms is to indicate any of the listed terms or any combination of the listed terms.

The use of ordinal numbers such as "first," "second," "third" and so on is to distinguish respective elements rather than to denote a particular order of those elements. For purpose of this description, the terms "multiple" and "a plurality of" refer to "two or more" or "more than one."

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment. In the figures, similar symbols typically identify similar components, unless context dictates otherwise. Further, unless otherwise noted, figures are not drawn to scale and are used for illustrative purposes only. Moreover, the figures are representational only and not all components are shown. For example, additional structural or restraining components might not be shown.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Overview

Different sensors may be provided on a mobile robotic device to allow the robotic device to detect obstacles and navigate within an environment. A tradeoff exists between accuracy and cost when considering available types of sensors. An arrangement of sensors may be selected to minimize cost while providing a guaranteed level of precision in obstacle detection.

Example robots described herein include multiple one-dimensional (1D) time-of-flight (ToF) depth sensors mounted at fixed positions and orientations. More specifically, a robot may include a mobile base with a group of 1D ToF sensors horizontally arranged along a rear side of the mobile base at a chosen height. Multiple such 1D ToF sensors may be spaced out to ensure that obstacles behind the robot at the chosen height that are bigger than a predetermined size will be detected. Advantageously, the 1D ToF sensors are relatively low cost compared with other available sensors, such as three-dimensional (3D) depth sensors.

When placing the 1D ToF sensors on the robot, positions and orientations of each sensor may be chosen to minimize the total number of sensors needed. More specifically, each pair of 1D ToF sensors may be oriented relative to each other so that respective cones of coverage of the two sensors do not overlap. If instead the coverage regions did overlap, this inefficiency may result in extra sensors being needed to satisfy a desired level of precision in overall sensor coverage. Instead of overlapping coverage regions, the sensors may be arranged to create substantially fixed-width negative lanes extending out from the robot that will not be detected by any of the sensors. The width of a negative lane may indicate the largest diameter of a cylindrical object that may not be detected by the sensors.

In some examples, the angular offset between a pair of consecutive sensors may be set equal to the field of view of the individual sensors. For instance, if the sensors each have a field of view of fifteen degrees, then the difference in orientation between the pair of sensors may be set equal to fifteen degrees. As a result, the pair of sensors may have a corresponding pair of parallel cone edges which result in a substantially fixed-width negative lane between the coverage cones of the two sensors. The width of such a negative lane may be chosen based on how far apart the two sensors are spaced on the robot. For instance, the sensors may be spaced to create a negative lane that fits a cylinder with a diameter of seven centimeters (cm), but no larger. This width may be chosen for safety based on the width of a potential operator's leg to ensure that the operator is detected. In other examples, different widths may be used for the negative lanes for different applications.

When 1D ToF sensors are positioned along a surface which is not substantially flat (e.g., the back of a mobile base including rounded corners), customized positions and orientations may be chosen for each sensor in a group of sensors to accommodate the shape of the surface. More specifically, both the position and the orientation of each sensor may be determined to generate substantially fixed-width negative lanes between each pair of consecutive sensor cones. The substantially fixed-width negative lanes may all have the same width in some examples or may have different widths in other examples. In some examples, the sensors may first be mounted at the determined positions and orientations to a custom shaped part such as a sheet metal bracket which is customized to fit to the robot.

The robot may include openings to allow each of the 1D ToF sensors to project a laser beam into the environment. In other examples, a window material may be used that allows the laser beams to pass through, such as an infrared material. The window sizes may be chosen to minimize any obstruction to the fields of view of each of the sensors.

In some examples, the 1D ToF sensors may be arranged on multiple separate strips so that data from the sensors on each strip may be processed in parallel. For instance, two strips may be arranged on either side of the rear of the robot base such that each strip includes four horizontally arranged sensors. The rate at which data from the sensors is processed may be associated with an allowed maximum velocity (e.g., a reverse velocity) for the robot. Accordingly, by using two separate strips, data can be pulled from the sensors twice as fast as a single strip. In some examples, the two strips may be symmetric.

In further examples, a mobile robot may additionally include one or more downward-facing 1D ToF sensors for cliff detection. For instance, one downward-facing 1D ToF cliff sensor may be placed proximate to each of two rear wheels of the robot. Data from these cliff sensors may be used by the robot to determine when to stop when the robot is backing up to avoid falling off a cliff. In some of these examples, one or more downward-facing cliff sensors may be included on a strip that also includes horizontally arranged 1D ToF sensors for obstacle detection. For instance, each of two symmetric strips may include four horizontally arranged 1D ToF sensors and one downward-facing 1D ToF sensor. The rate at which sensor data is pulled from one or more downward-facing 1D ToF sensors may also be used to dictate a maximum reverse velocity for the robot.

A set of 1D ToF sensors may be arranged to fit into the overall sensor suite for a mobile robotic device. In some examples, more precise sensor data may be needed for an area in front of the robotic device than for an area behind the robotic device. Accordingly, a relatively more expensive sensor such as a 3D lidar sensor may be used to detect obstacles and/or cliffs in front of the robot while cheaper 1D ToF sensors are used to detect obstacles and/or cliffs behind the robot. The positions and orientations of the 1D ToF sensors may also be chosen based on fields of view of other sensors on the robot. For instance, larger blindspot cylinders between consecutive 1D ToF sensors may be permitted in areas on the sides of the robot where a 3D lidar also provides some coverage than in an area directly behind the robot where the 3D lidar does not provide coverage. In other examples, a group of two or more 1D ToF sensors for object detection and/or one or more downward-facing 1D ToF cliff sensors may be beneficially incorporated into a variety of different possible robot morphologies and sensor suites.

II. Example Robotic Systems

FIG. 1 illustrates an example configuration of a robotic system that may be used in connection with the implementations described herein. Robotic system 100 may be configured to operate autonomously, semi-autonomously, or using directions provided by user(s). Robotic system 100 may be implemented in various forms, such as a robotic arm, industrial robot, or some other arrangement. Some example implementations involve a robotic system 100 engineered to be low cost at scale and designed to support a variety of tasks. Robotic system 100 may be designed to be capable of operating around people. Robotic system 100 may also be optimized for machine learning. Throughout this description, robotic system 100 may also be referred to as a robot, robotic device, or mobile robot, among other designations.

As shown in FIG. 1, robotic system 100 may include processor(s) 102, data storage 104, and controller(s) 108, which together may be part of control system 118. Robotic system 100 may also include sensor(s) 112, power source(s) 114, mechanical components 110, and electrical components 116. Nonetheless, robotic system 100 is shown for illustrative purposes, and may include more or fewer components. The various components of robotic system 100 may be connected in any manner, including wired or wireless connections. Further, in some examples, components of robotic system 100 may be distributed among multiple physical entities rather than a single physical entity. Other example illustrations of robotic system 100 may exist as well.

Processor(s) 102 may operate as one or more general-purpose hardware processors or special purpose hardware processors (e.g., digital signal processors, application specific integrated circuits, etc.). Processor(s) 102 may be configured to execute computer-readable program instructions 106, and manipulate data 107, both of which are stored in data storage 104. Processor(s) 102 may also directly or indirectly interact with other components of robotic system 100, such as sensor(s) 112, power source(s) 114, mechanical components 110, or electrical components 116.

Data storage 104 may be one or more types of hardware memory. For example, data storage 104 may include or take the form of one or more computer-readable storage media that can be read or accessed by processor(s) 102. The one or more computer-readable storage media can include volatile or non-volatile storage components, such as optical, magnetic, organic, or another type of memory or storage, which can be integrated in whole or in part with processor(s) 102. In some implementations, data storage 104 can be a single physical device. In other implementations, data storage 104 can be implemented using two or more physical devices, which may communicate with one another via wired or wireless communication. As noted previously, data storage 104 may include the computer-readable program instructions 106 and data 107. Data 107 may be any type of data, such as configuration data, sensor data, or diagnostic data, among other possibilities.

Controller 108 may include one or more electrical circuits, units of digital logic, computer chips, or microprocessors that are configured to (perhaps among other tasks), interface between any combination of mechanical components 110, sensor(s) 112, power source(s) 114, electrical components 116, control system 118, or a user of robotic system 100. In some implementations, controller 108 may be a purpose-built embedded device for performing specific operations with one or more subsystems of the robotic system 100.

Control system 118 may monitor and physically change the operating conditions of robotic system 100. In doing so, control system 118 may serve as a link between portions of robotic system 100, such as between mechanical components 110 or electrical components 116. In some instances, control system 118 may serve as an interface between robotic system 100 and another computing device. Further, control system 118 may serve as an interface between robotic system 100 and a user. In some instances, control system 118 may include various components for communicating with robotic system 100, including a joystick, buttons, or ports, etc. The example interfaces and communications noted above may be implemented via a wired or wireless connection, or both. Control system 118 may perform other operations for robotic system 100 as well.

During operation, control system 118 may communicate with other systems of robotic system 100 via wired or wireless connections, and may further be configured to communicate with one or more users of the robot. As one possible illustration, control system 118 may receive an input (e.g., from a user or from another robot) indicating an instruction to perform a requested task, such as to pick up and move an object from one location to another location. Based on this input, control system 118 may perform operations to cause the robotic system 100 to make a sequence of movements to perform the requested task. As another illustration, a control system may receive an input indicating an instruction to move to a requested location. In response, control system 118 (perhaps with the assistance of other components or systems) may determine a direction and speed to move robotic system 100 through an environment en route to the requested location.

Operations of control system 118 may be carried out by processor(s) 102. Alternatively, these operations may be carried out by controller(s) 108, or a combination of processor(s) 102 and controller(s) 108. In some implementations, control system 118 may partially or wholly reside on a device other than robotic system 100, and therefore may at least in part control robotic system 100 remotely.

Mechanical components 110 represent hardware of robotic system 100 that may enable robotic system 100 to perform physical operations. As a few examples, robotic system 100 may include one or more physical members, such as an arm, an end effector, a head, a neck, a torso, a base, and wheels. The physical members or other parts of robotic system 100 may further include actuators arranged to move the physical members in relation to one another. Robotic system 100 may also include one or more structured bodies for housing control system 118 or other components, and may further include other types of mechanical components. The particular mechanical components 110 used in a given robot may vary based on the design of the robot, and may also be based on the operations or tasks the robot may be configured to perform.

In some examples, mechanical components 110 may include one or more removable components. Robotic system 100 may be configured to add or remove such removable components, which may involve assistance from a user or another robot. For example, robotic system 100 may be configured with removable end effectors or digits that can be replaced or changed as needed or desired. In some implementations, robotic system 100 may include one or more removable or replaceable battery units, control systems, power systems, bumpers, or sensors. Other types of removable components may be included within some implementations.

Robotic system 100 may include sensor(s) 112 arranged to sense aspects of robotic system 100. Sensor(s) 112 may include one or more force sensors, torque sensors, velocity sensors, acceleration sensors, position sensors, proximity sensors, motion sensors, location sensors, load sensors, temperature sensors, touch sensors, depth sensors, ultrasonic range sensors, infrared sensors, object sensors, or cameras, among other possibilities. Within some examples, robotic system 100 may be configured to receive sensor data from sensors that are physically separated from the robot (e.g., sensors that are positioned on other robots or located within the environment in which the robot is operating).

Sensor(s) 112 may provide sensor data to processor(s) 102 (perhaps by way of data 107) to allow for interaction of robotic system 100 with its environment, as well as monitoring of the operation of robotic system 100. The sensor data may be used in evaluation of various factors for activation, movement, and deactivation of mechanical components 110 and electrical components 116 by control system 118. For example, sensor(s) 112 may capture data corresponding to the terrain of the environment or location of nearby objects, which may assist with environment recognition and navigation.

In some examples, sensor(s) 112 may include RADAR (e.g., for long-range object detection, distance determination, or speed determination), LIDAR (e.g., for short-range object detection, distance determination, or speed determination), SONAR (e.g., for underwater object detection, distance determination, or speed determination), VICON® (e.g., for motion capture), one or more cameras (e.g., stereoscopic cameras for 3D vision), a global positioning system (GPS) transceiver, or other sensors for capturing information of the environment in which robotic system 100 is operating. Sensor(s) 112 may monitor the environment in real time, and detect obstacles, elements of the terrain, weather conditions, temperature, or other aspects of the environment. In another example, sensor(s) 112 may capture data corresponding to one or more characteristics of a target or identified object, such as a size, shape, profile, structure, or orientation of the object.

Further, robotic system 100 may include sensor(s) 112 configured to receive information indicative of the state of robotic system 100, including sensor(s) 112 that may monitor the state of the various components of robotic system 100. Sensor(s) 112 may measure activity of systems of robotic system 100 and receive information based on the operation of the various features of robotic system 100, such as the operation of an extendable arm, an end effector, or other mechanical or electrical features of robotic system 100. The data provided by sensor(s) 112 may enable control system 118 to determine errors in operation as well as monitor overall operation of components of robotic system 100.

As an example, robotic system 100 may use force/torque sensors to measure load on various components of robotic system 100. In some implementations, robotic system 100 may include one or more force/torque sensors on an arm or end effector to measure the load on the actuators that move one or more members of the arm or end effector. In some examples, the robotic system 100 may include a force/torque sensor at or near the wrist or end effector, but not at or near other joints of a robotic arm. In further examples, robotic system 100 may use one or more position sensors to sense the position of the actuators of the robotic system. For instance, such position sensors may sense states of extension, retraction, positioning, or rotation of the actuators on an arm or end effector.

As another example, sensor(s) 112 may include one or more velocity or acceleration sensors. For instance, sensor(s) 112 may include an inertial measurement unit (IMU). The IMU may sense velocity and acceleration in the world frame, with respect to the gravity vector. The velocity and acceleration sensed by the IMU may then be translated to that of robotic system 100 based on the location of the IMU in robotic system 100 and the kinematics of robotic system 100.

Robotic system 100 may include other types of sensors not explicitly discussed herein. Additionally or alternatively, the robotic system may use particular sensors for purposes not enumerated herein.

Robotic system 100 may also include one or more power source(s) 114 configured to supply power to various components of robotic system 100. Among other possible power systems, robotic system 100 may include a hydraulic system, electrical system, batteries, or other types of power systems. As an example illustration, robotic system 100 may include one or more batteries configured to provide charge to components of robotic system 100. Some of mechanical components 110 or electrical components 116 may each connect to a different power source, may be powered by the same power source, or be powered by multiple power sources.

Any type of power source may be used to power robotic system 100, such as electrical power or a gasoline engine. Additionally or alternatively, robotic system 100 may include a hydraulic system configured to provide power to mechanical components 110 using fluid power. Components of robotic system 100 may operate based on hydraulic fluid being transmitted throughout the hydraulic system to various hydraulic motors and hydraulic cylinders, for example. The hydraulic system may transfer hydraulic power by way of pressurized hydraulic fluid through tubes, flexible hoses, or other links between components of robotic system 100. Power source(s) 114 may charge using various types of charging, such as wired connections to an outside power source, wireless charging, combustion, or other examples.

Electrical components 116 may include various mechanisms capable of processing, transferring, or providing electrical charge or electric signals. Among possible examples, electrical components 116 may include electrical wires, circuitry, or wireless communication transmitters and receivers to enable operations of robotic system 100. Electrical components 116 may interwork with mechanical components 110 to enable robotic system 100 to perform various operations. Electrical components 116 may be configured to provide power from power source(s) 114 to the various mechanical components 110, for example. Further, robotic system 100 may include electric motors. Other examples of electrical components 116 may exist as well.

Robotic system 100 may include a body, which may connect to or house appendages and components of the robotic system. As such, the structure of the body may vary within examples and may further depend on particular operations that a given robot may have been designed to perform. For example, a robot developed to carry heavy loads may have a wide body that enables placement of the load. Similarly, a robot designed to operate in tight spaces may have a relatively tall, narrow body. Further, the body or the other components may be developed using various types of materials, such as metals or plastics. Within other examples, a robot may have a body with a different structure or made of various types of materials.

The body or the other components may include or carry sensor(s) 112. These sensors may be positioned in various locations on the robotic system 100, such as on a body, a head, a neck, a torso, a base, an arm, or an end effector, among other examples.

Robotic system 100 may be configured to carry a load, such as a type of cargo that is to be transported. In some examples, the load may be placed by the robotic system 100 into a bin or other container attached to the robotic system 100. The load may also represent external batteries or other types of power sources (e.g., solar panels) that the robotic system 100 may utilize. Carrying the load represents one example use for which the robotic system 100 may be configured, but the robotic system 100 may be configured to perform other operations as well.

As noted above, robotic system 100 may include various types of appendages, wheels, end effectors, gripping devices and so on. In some examples, robotic system 100 may include a mobile base with wheels, treads, or some other form of locomotion. Additionally, robotic system 100 may include a robotic arm or some other form of robotic manipulator. In the case of a mobile base, the base may be considered as one of mechanical components 110 and may include wheels, powered by one or more of actuators, which allow for mobility of a robotic arm in addition to the rest of the body.

Figure 2:
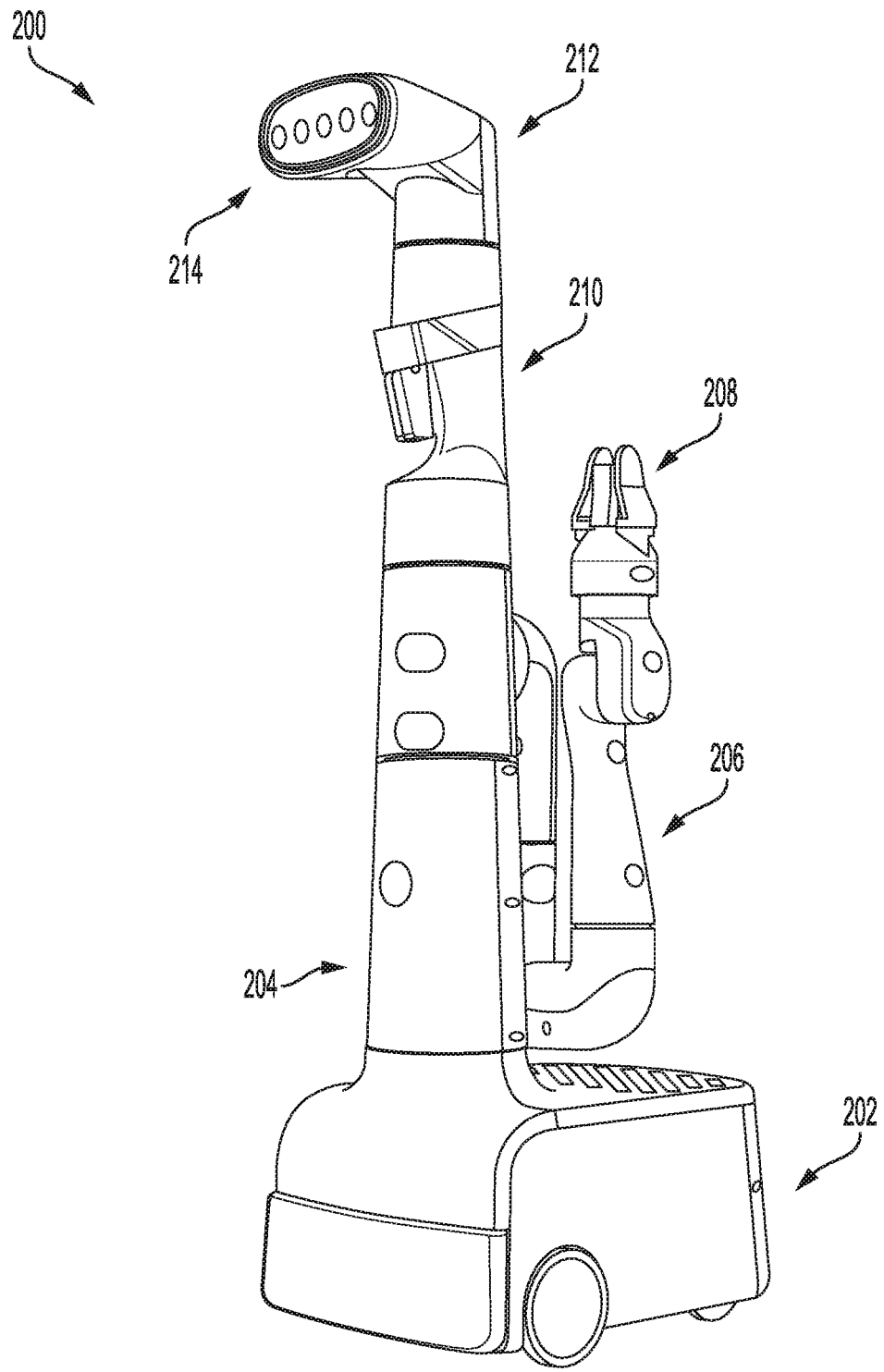
FIG. 2 illustrates a mobile robot, in accordance with example embodiments.
Figure 3:
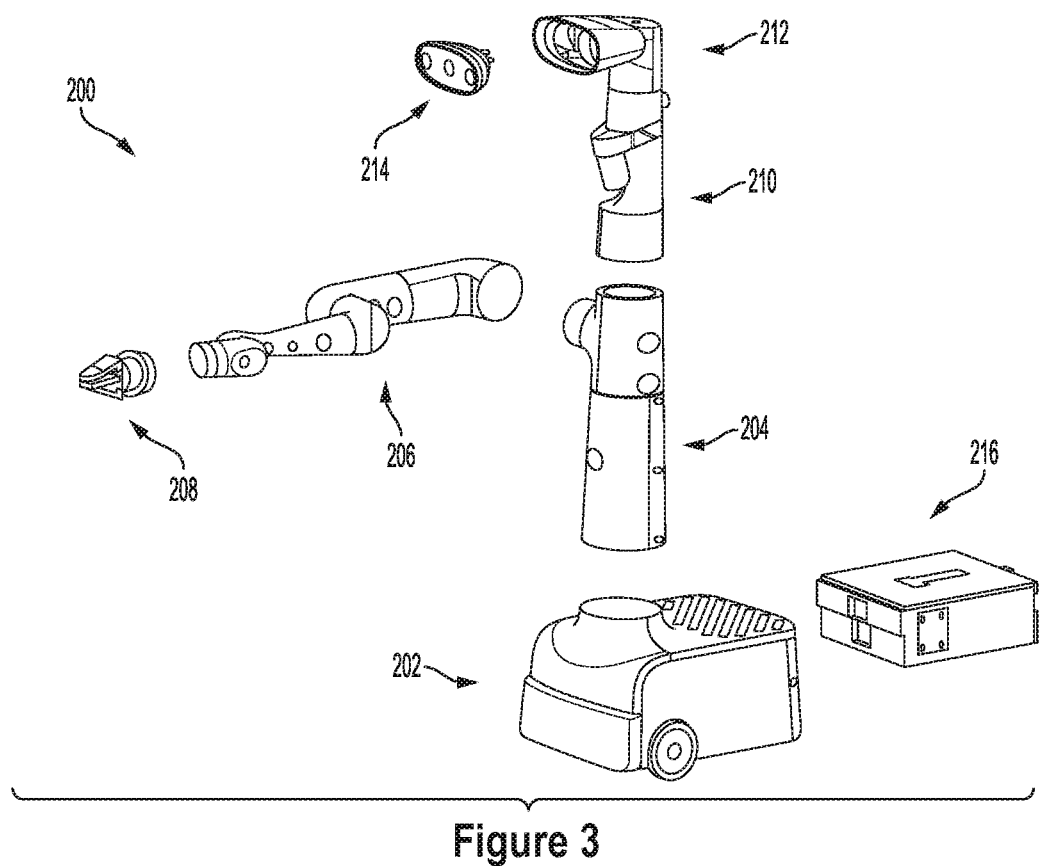
FIG. 3 illustrates an exploded view of a mobile robot, in accordance with example embodiments.

FIG. 2 illustrates a mobile robot, in accordance with example embodiments. FIG. 3 illustrates an exploded view of the mobile robot, in accordance with example embodiments. More specifically, a robot 200 may include a mobile base 202, a midsection 204, an arm 206, an end-of-arm system (EOAS) 208, a mast 210, a perception housing 212, and a perception suite 214. The robot 200 may also include a compute box 216 stored within mobile base 202.

The mobile base 202 includes two drive wheels positioned at a front end of the robot 200 in order to provide locomotion to robot 200. The mobile base 202 also includes additional casters (not shown) to facilitate motion of the mobile base 202 over a ground surface. The mobile base 202 may have a modular architecture that allows compute box 216 to be easily removed. Compute box 216 may serve as a removable control system for robot 200 (rather than a mechanically integrated control system). After removing external shells, the compute box 216 can be easily removed and/or replaced. The mobile base 202 may also be designed to allow for additional modularity. For example, the mobile base 202 may also be designed so that a power system, a battery, and/or external bumpers can all be easily removed and/or replaced.

The midsection 204 may be attached to the mobile base 202 at a front end of the mobile base 202. The midsection 204 includes a mounting column which is fixed to the mobile base 202. The midsection 204 additionally includes a rotational joint for arm 206. More specifically, the midsection 204 includes the first two degrees of freedom for arm 206 (a shoulder yaw J0 joint and a shoulder pitch J1 joint). The mounting column and the shoulder yaw J0 joint may form a portion of a stacked tower at the front of mobile base 202. The mounting column and the shoulder yaw J0 joint may be coaxial. The length of the mounting column of midsection 204 may be chosen to provide the arm 206 with sufficient height to perform manipulation tasks at commonly encountered height levels (e.g., coffee table top and counter top levels). The length of the mounting column of midsection 204 may also allow the shoulder pitch J1 joint to rotate the arm 206 over the mobile base 202 without contacting the mobile base 202.

The arm 206 may be a 7DOF robotic arm when connected to the midsection 204. As noted, the first two DOFs of the arm 206 may be included in the midsection 204. The remaining five DOFs may be included in a standalone section of the arm 206 as illustrated in FIGS. 2 and 3. The arm 206 may be made up of plastic monolithic link structures. Inside the arm 206 may be housed standalone actuator modules, local motor drivers, and thru bore cabling.

The EOAS 208 may be an end effector at the end of arm 206. EOAS 208 may allow the robot 200 to manipulate objects in the environment. As shown in FIGS. 2 and 3, EOAS 208 may be a gripper, such as an underactuated pinch gripper. The gripper may include one or more contact sensors such as force/torque sensors and/or non-contact sensors such as one or more cameras to facilitate object detection and gripper control. EOAS 208 may also be a different type of gripper such as a suction gripper or a different type of tool such as a drill or a brush. EOAS 208 may also be swappable or include swappable components such as gripper digits.

The mast 210 may be a relatively long, narrow component between the shoulder yaw J0 joint for arm 206 and perception housing 212. The mast 210 may be part of the stacked tower at the front of mobile base 202. The mast 210 may be coaxial with the midsection 204. The length of the mast 210 may facilitate perception by perception suite 214 of objects being manipulated by EOAS 208. The mast 210 may have a length such that when the shoulder pitch J1 joint is rotated vertical up, a topmost point of a bicep of the arm 206 is approximately aligned with a top of the mast 210. The length of the mast 210 may then be sufficient to prevent a collision between the perception housing 212 and the arm 206 when the shoulder pitch J1 joint is rotated vertical up.

As shown in FIGS. 2 and 3, the mast 210 may include a lidar sensor. The lidar sensor may be a spinning three-dimensional (3D) depth sensor. The lidar sensor may be coupled to a carved out portion of the mast 210 fixed at a downward angle. The lidar position may be optimized for localization, navigation, and for front cliff detection.

The perception housing 212 may include at least one sensor making up perception suite 214. The perception housing 212 may be connected to a pan/tilt control to allow for reorienting of the perception housing 212 (e.g., to view objects being manipulated by EOAS 208). The perception housing 212 may be a part of the stacked tower fixed to the mobile base 202. A rear portion of the perception housing 212 may be coaxial with the mast 210.

The perception suite 214 may include a suite of sensors configured to collect sensor data representative of the environment of the robot 200. The perception suite 214 may include an infrared (IR)-assisted stereo depth sensor. The perception suite 214 may additionally include a wide-angled red-green-blue (RGB) camera for human-robot interaction and context information. The perception suite 214 may additionally include a high resolution RGB camera for object classification. A face light ring surrounding the perception suite 214 may also be included for improved human-robot interaction and scene illumination.

Figure 4:
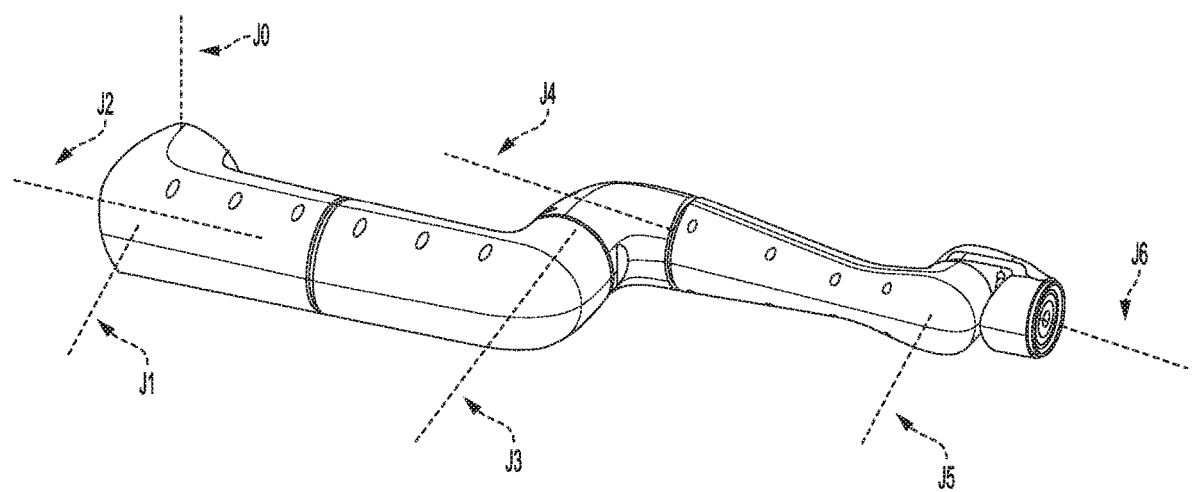
FIG. 4 illustrates a robotic arm, in accordance with example embodiments.

FIG. 4 illustrates a robotic arm, in accordance with example embodiments. The robotic arm includes 7 DOFs: a shoulder yaw J0 joint, a shoulder pitch J1 joint, a bicep roll J2 joint, an elbow pitch J3 joint, a forearm roll J4 joint, a wrist pitch J5 joint, and wrist roll J6 joint. Each of the joints may be coupled to one or more actuators. The actuators coupled to the joints may be operable to cause movement of links down the kinematic chain (as well as any end effector attached to the robot arm).

The shoulder yaw J0 joint allows the robot arm to rotate toward the front and toward the back of the robot. One beneficial use of this motion is to allow the robot to pick up an object in front of the robot and quickly place the object on the rear section of the robot (as well as the reverse motion). Another beneficial use of this motion is to quickly move the robot arm from a stowed configuration behind the robot to an active position in front of the robot (as well as the reverse motion).

The shoulder pitch J1 joint allows the robot to lift the robot arm (e.g., so that the bicep is up to perception suite level on the robot) and to lower the robot arm (e.g., so that the bicep is just above the mobile base). This motion is beneficial to allow the robot to efficiently perform manipulation operations (e.g., top grasps and side grasps) at different target height levels in the environment. For instance, the shoulder pitch J1 joint may be rotated to a vertical up position to allow the robot to easily manipulate objects on a table in the environment. The shoulder pitch J1 joint may be rotated to a vertical down position to allow the robot to easily manipulate objects on a ground surface in the environment.

The bicep roll J2 joint allows the robot to rotate the bicep to move the elbow and forearm relative to the bicep. This motion may be particularly beneficial for facilitating a clear view of the EOAS by the robot's perception suite. By rotating the bicep roll J2 joint, the robot may kick out the elbow and forearm to improve line of sight to an object held in a gripper of the robot.

Moving down the kinematic chain, alternating pitch and roll joints (a shoulder pitch J1 joint, a bicep roll J2 joint, an elbow pitch J3 joint, a forearm roll J4 joint, a wrist pitch J5 joint, and wrist roll J6 joint) are provided to improve the manipulability of the robotic arm. The axes of the wrist pitch J5 joint, the wrist roll J6 joint, and the forearm roll J4 joint are intersecting for reduced arm motion to reorient objects. The wrist roll J6 point is provided instead of two pitch joints in the wrist in order to improve object rotation.

In some examples, a robotic arm such as the one illustrated in FIG. 4 may be capable of operating in a teach mode. In particular, teach mode may be an operating mode of the robotic arm that allows a user to physically interact with and guide robotic arm towards carrying out and recording various movements. In a teaching mode, an external force is applied (e.g., by the user) to the robotic arm based on a teaching input that is intended to teach the robot regarding how to carry out a specific task. The robotic arm may thus obtain data regarding how to carry out the specific task based on instructions and guidance from the user. Such data may relate to a plurality of configurations of mechanical components, joint position data, velocity data, acceleration data, torque data, force data, and power data, among other possibilities.

During teach mode the user may grasp onto the EOAS or wrist in some examples or onto any part of robotic arm in other examples, and provide an external force by physically moving robotic arm. In particular, the user may guide the robotic arm towards grasping onto an object and then moving the object from a first location to a second location. As the user guides the robotic arm during teach mode, the robot may obtain and record data related to the movement such that the robotic arm may be configured to independently carry out the task at a future time during independent operation (e.g., when the robotic arm operates independently outside of teach mode). In some examples, external forces may also be applied by other entities in the physical workspace such as by other objects, machines, or robotic systems, among other possibilities.

Figure 5A:
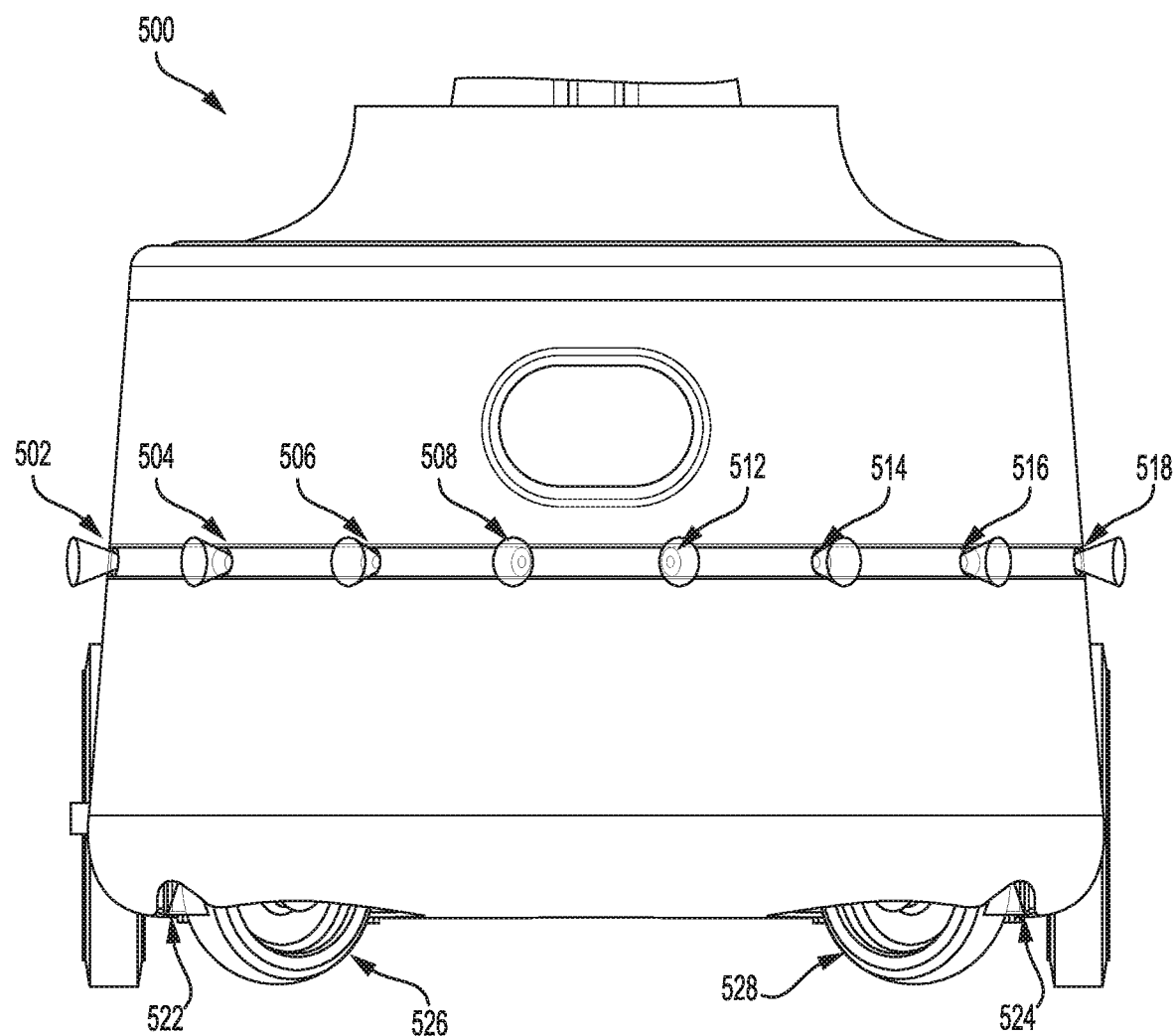
FIGS. 5A and 5B illustrate 1D ToF sensors on a mobile base, in accordance with example embodiments.
Figure 5B:
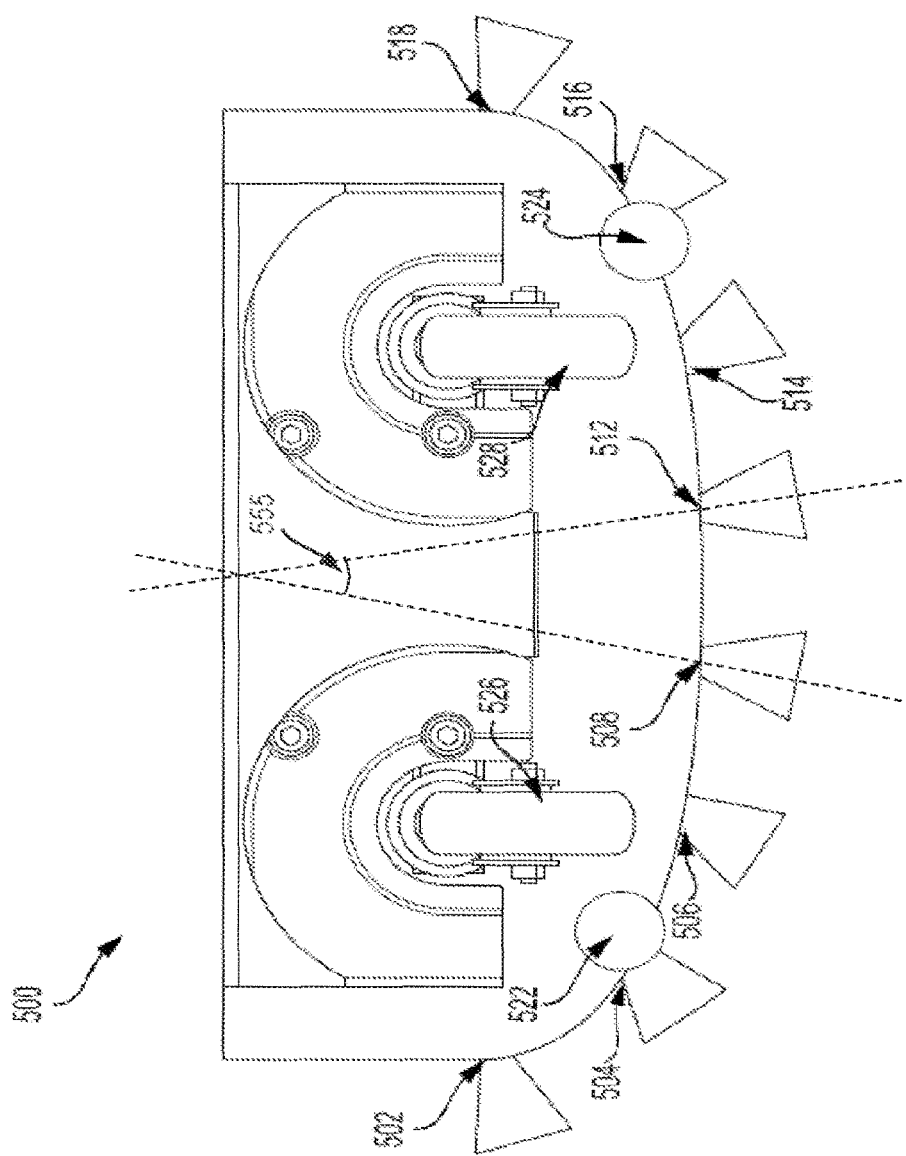

FIGS. 5A and 5B illustrate 1D ToF sensors on a mobile base, in accordance with example embodiments. More specifically, FIG. 5A illustrates a side view and FIG. 5B illustrates a bottom view of a mobile base 500 for a robotic device. The mobile base 500 may be part of a robotic device which also includes other components, such as illustrated and described with respect to FIGS. 1-4. The mobile base 500 may include wheels 526 and 528. The wheels 526 and 528 may be casters that are used in addition to one or more drive wheels to enable locomotion within an environment. Other types of locomotion enabling components may also be used as well or instead.

The mobile base 500 illustrated in FIGS. 5A and 5B includes eight 1D ToF sensors 502, 504, 506, 508, 512, 514, 516, and 518 arranged on a rear side of the mobile base 500. The mobile base additionally includes two downward-facing 1D ToF sensors 522 and 524 positioned proximate to wheels 526 and 528. Different numbers and combinations of 1D ToF sensors may also be used. In some examples, 1D ToF sensors may be arranged along a common plane, such as a horizontal plane as illustrated. In other examples, a different arrangement of 1D ToF sensors may be used, such as a checkerboard pattern. A group of 1D ToF sensors may also be arranged on a different surface of a mobile robotic base, such as a front surface, as well or instead.

Each 1D ToF sensor is configured to measure distance to an object in the environment based on the time it takes for light to travel from the sensor to the object and then reflect back to the sensor. Each 1D ToF sensor may include a separate light emitter (e.g., a laser or light-emitting diode (LED)) and detector in order to measure distance to an object. In some examples, a pass-through material may be positioned in front of each of the 1D ToF sensors. Each 1D ToF sensor may have a field of view that takes the form of a cone extending out from the sensor. In some examples, the field of view of each sensor may be approximately fifteen degrees. In other examples, 1D ToF sensors with a different field of view may be used and/or different individual sensors may have different fields of view.

Figure 6A:
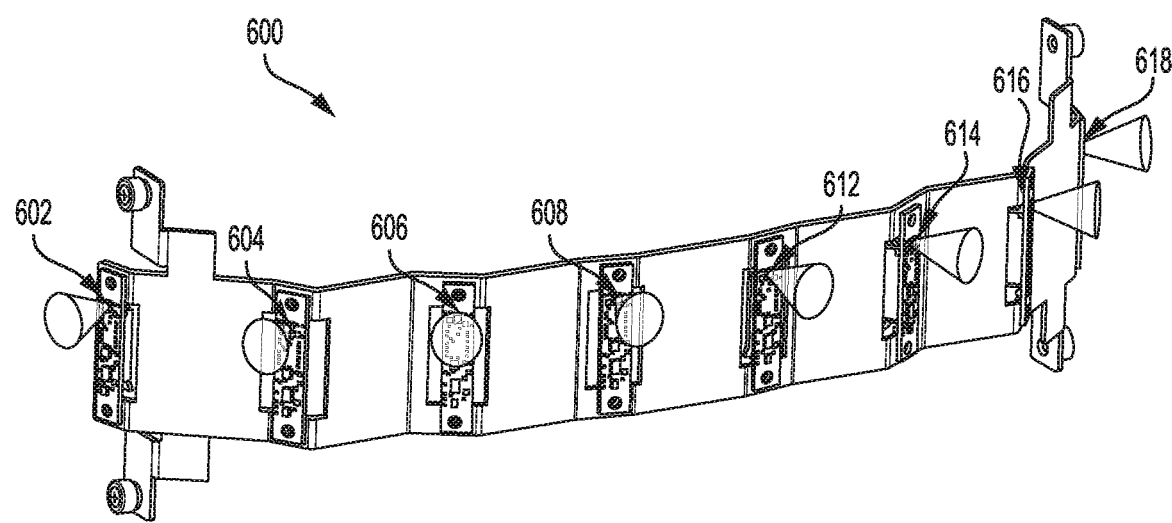
FIGS. 6A and 6B illustrate 1D ToF sensors mounted on a mounting bracket, in accordance with example embodiments.
Figure 6B:
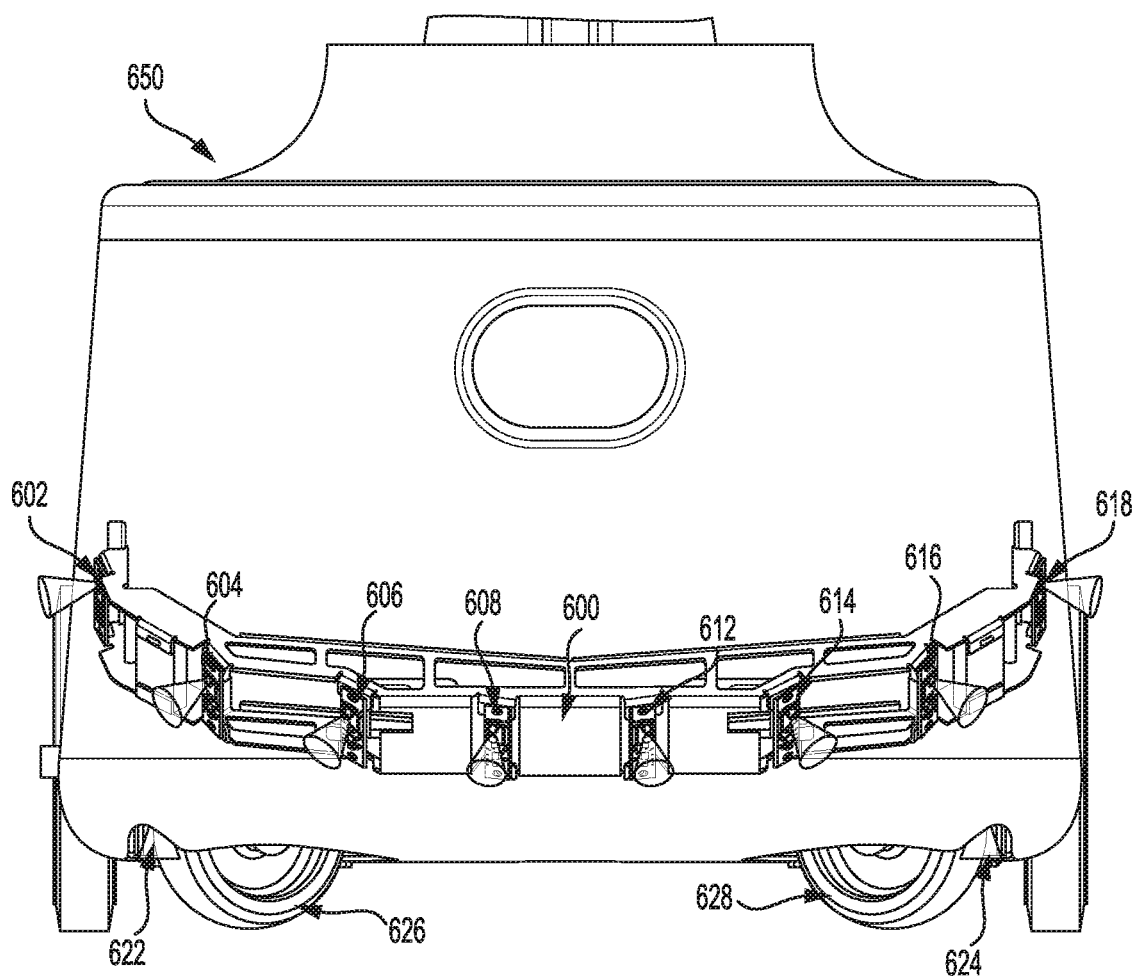

With respect to FIGS. 5A and 6B, the horizontally arranged 1D ToF sensors 502, 504, 506, 508, 512, 514, 516, and 518 may be spaced out along a common plane at a chosen height (e.g., 20 centimeters) in order to ensure that sufficiently large objects at the chosen height will be detected by the group of sensors. The 1D ToF sensors provide a cost-efficient alternative to more complex sensors such as a 3D lidar sensor.

As illustrated in FIGS. 5A and 5B, in addition to a positional offset, each consecutive pair of 1D ToF sensors of the horizontally arranged 1D ToF sensors may also be mounted at a different orientation. More specifically, moving from left to right, each 1D ToF sensor 502, 504, 506, 508, 512, 514, 516, and 518 may be mounted at an orientation that points the sensor further to the right than the previous sensor in the group. Providing an angular offset between each pair of consecutive 1D ToF sensors in this manner can ensure that the cones of coverage of each 1D ToF sensor of the pair do not overlap, thereby avoiding inefficient redundant coverage areas.

In further examples, the orientations of the horizontally arranged 1D ToF sensors 502, 504, 506, 508, 512, 514, 516, and 518 may be set so that consecutive pairs of 1D ToF sensors each have a respective cone edge which is parallel. This arrangement results in substantially fixed-width negative lanes between consecutive sensors such that the negative lanes will not be sensed by any sensors in the group. By generating a coverage region with substantially fixed-width negative lanes, a predictable cap on the size of an object that may be missed by the group of sensors may be determined.

An area of the rear surface of the mobile base 500 on which 1D ToF sensors are mounted may be substantially flat. In this area, consecutive 1D sensors may be mounted at angles that differ by their individual field of view angle (e.g., fifteen degrees) to ensure parallel cone edges and no coverage area overlap. Other areas of the rear surface of the mobile base 500 may not be flat, such as at the corners where the surface is rounded. In such areas, consecutive 1D sensors may be mounted at angles that take into account the curvature of the rear surface of the mobile base 500 to similarly achieve substantially fixed-width negative lanes.

The mobile base 500 additionally includes two downward-facing 1D ToF sensors for cliff detection. The 1D ToF sensor 522 is positioned proximate to wheel 526 and the 1D ToF sensor 524 is positioned proximate to wheel 528. Data from these cliff sensors may be used to determine when the mobile base 500 is about to travel off a cliff by detecting when a ground surface at the expected height is no longer detected. Different numbers or arrangements of cliff sensors are also possible. In various examples, 1D ToF cliff sensors may be used in addition to or instead of 1D ToF sensors for obstacle detection.

In the example illustrated in FIGS. 5A and 5B, data from the horizontally arranged 1D ToF sensors 502, 504, 506, 508, 512, 514, 516, and 518 as well as data from the downward-facing 1D ToF cliff sensors 522 and 524 may be used to help control the mobile base 500 to navigate. For instance, when a horizontally arranged sensor detects an obstacle, the mobile base 500 may be controlled by a control system to stop or to change direction (e.g., to avoid a collision). Additionally, when a cliff sensor detects a cliff, the mobile base 500 may be controlled by a control system to stop or to change direction (e.g., to avoid falling off the cliff).

Navigation control of a robot having the mobile base 500 may depend on sensor data from each of the illustrated 1D ToF sensors. Accordingly, a maximum velocity (e.g., a maximum reverse velocity) may be set for the robot based on how fast sensor data can be pulled from the 1D ToF sensors and processed. In some examples, the 1D ToF sensors may be divided into separate strips to allow for parallel processing. Data from each of the sensors on a strip may be collected and processed serially (e.g., by using a wired connection that attaches to each of the sensors). Accordingly, by including fewer sensors on a strip, data may be collected and processed more quickly, which may increase a maximum allowed velocity for the robot. As a specific example, 1D ToF sensors 502, 504, 506, 508, and 522 may be included on a first strip and 1D ToF sensors 512, 514, 516, 518, and 524 may be included on a second strip. In some examples such as this one, the two strips may be symmetric.

FIGS. 6A and 6B illustrate 1D ToF sensors mounted on a mounting bracket, in accordance with example embodiments. More specifically, 1D ToF sensors 602, 604, 606, 608, 612, 614, 616, and 618 may be mounted on a custom molded bracket 600. The bracket may be shaped to fit to a robotic device (e.g., to the rear side of a mobile base of a robot). In some examples, the bracket may be comprised of sheet metal. In other examples, the bracket may be comprised of a different material. As shown by FIG. 6A, each of the 1D ToF sensors may be mounted at a chosen position and orientation on the bracket 600 before attaching the bracket to a robot. By using a stiff mounting bracket, the sensors can be maintained at the selected positions and orientations over time to maintain desired coverage regions.

After the 1D ToF sensors are attached to the mounting bracket, the bracket may then be attached to a robot, as shown by FIG. 6B. More specifically, FIG. 6B illustrates a mobile base 650 for a robot. The bracket 600 which includes 1D ToF sensors 602, 604, 606, 608, 612, 614, 616, and 618 may be mounted on a rear surface of the mobile base 650. The mobile base may additionally include separately mounted 1D ToF cliff sensors 622 and 624 proximate to wheels 626 and 628.

The shape of the bracket 600 may be customized to a particular robot, taking into account the shape of the robot as well as the desired positions and orientations for the 1D ToF sensors to achieve desired coverage. Other factors may also be considered, such as desired stiffness, angular tolerance, and air flow. In further examples, multiple brackets may be used. For instance, instead of bracket 600, two separate brackets may be used which each contain four of the 1D ToF sensors. In this case, the two separate brackets may be symmetric.

Figure 7:
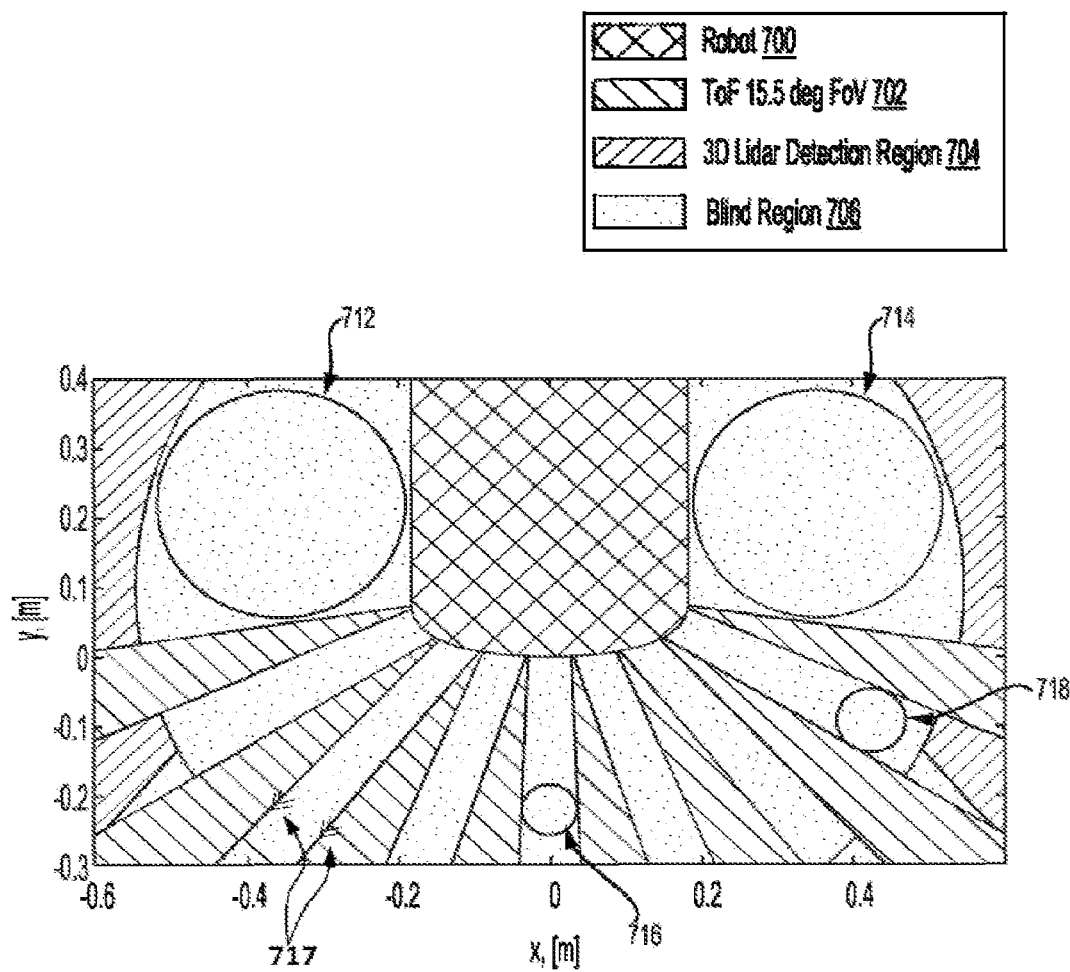
FIG. 7 illustrates coverage regions of a group of sensors, in accordance with example embodiments.

FIG. 7 illustrates coverage regions of a group of sensors, in accordance with example embodiments. More specifically, the group of sensors may include eight horizontally arranged 1D ToF sensors along the rear side of a mobile base of a robot, such as illustrated and described with respect to FIGS. 5A-5B and 6A-6B. The group of sensors may additionally include a 3D lidar sensor mounted to a carved-out portion of a fixed mast, such as illustrated and described with respect to FIGS. 2 and 3.

In reference to FIG. 7, a top down view of two-dimensional coverage regions of the group of sensors is shown for the height at which the horizontally arranged 1D ToF sensors are mounted. The region 700 contains the robotic device itself. The region 702 includes the coverage regions of each of the eight horizontally arranged 1D ToF sensors. As shown, each 1D ToF sensor has a field of view of approximately 15.5 degrees extending out from the sensor. The 1D ToF sensors are fixed at predetermined positions and orientations to produce substantially fixed-width negative lanes between each pair of consecutive sensor cones.

The substantially fixed-width negative lanes make up part of blind region 706. If cones of coverage of consecutive sensors are aligned so that they share a pair of perfectly parallel cone edges, then the negative lane in between will have a perfectly fixed width extending out from the robot. In practice, the width of the negative lanes may increase slightly as illustrated (or decrease slightly) as they extend out from the robot. Regardless, the coverage regions may still be considered to be non-overlapping based on the detectable range of the sensors. Additionally, a maximum obstacle size that may be missed by the sensors can be guaranteed within a chosen distance behind the robot.

In some examples, two negative lanes may have different widths. For instance, as illustrated in FIG. 7, a negative lane toward the center of the rear side of the robot may include a potential object size represented by circle 716 while a negative lane toward the right of the rear side of the robot may include a larger potential object size represented by circle 718. Different widths for different negative lanes may be chosen based on various factors, including coverage provided by other sensors.

Additional coverage is provided by a 3D lidar sensor, as shown by region 704. In some examples, the 3D lidar sensor and the plurality of 1D ToF sensors may be fixed relative to each other on the mobile robotic device. Accordingly, the 3D lidar sensor and the plurality of 1D ToF sensors may define a combined coverage region with a plurality of predefined fixed negative volumes surrounding the mobile robotic device. A predetermined bound on the dimensions of such negative volumes can be set to put an upper limit on the object size that can evade detection anywhere in the robot's immediate surroundings. In further examples, this concept may be generalized to combine a plurality of 1D ToF sensors with an arbitrary sensing modality that results in the size of any one contiguous negative sensing region having a fixed upper bound in size.

In reference to FIG. 7, because region 704 overlaps the negative lane which includes circle 718, that negative lane may be allowed to have a greater width than the negative lane which includes circle 716. In general, given other available sensor coverage such as that provided by a 3D lidar sensor, the 1D ToF sensors may be spaced and oriented to ensure a chosen maximum size object which could fit within a negative region behind the robot. As an example, the maximum diameter of such a blind spot may be set to seven centimeters (e.g., approximately the width of a potential operator's leg).

In some examples, larger blind spots in coverage may be permitted to the sides of the robot than behind the robot. For instance, as illustrated in FIG. 7, blind regions on either side of the robot may include circles 712 and 714. Larger blind spots may be permitted to the sides of the robot than behind the robot because of the available directions of travel of the robot. In addition, sensor coverage at a different height may also be considered. For instance, larger blind spots on the sides of the robot may be permitted because the 3D lidar sensor provides additional coverage at a greater height (e.g., which may be expected to detect an operator standing within a blind spot).

FIG. 7 provides an illustrative coverage region of a system employing some of the arrangements and techniques described herein. Other arrangements employing a set of 1D ToF sensors as described herein may result in different coverage regions. Other types of coverage maps, including 3D coverage maps may also be used in other examples. Additionally, the robot represented by FIG. 7 may or may not include one or more downward-facing 1D ToF sensors for cliff detection and/or other 1D ToF sensors than the 1D ToF sensors for which coverage regions are illustrated.

Figure 8:
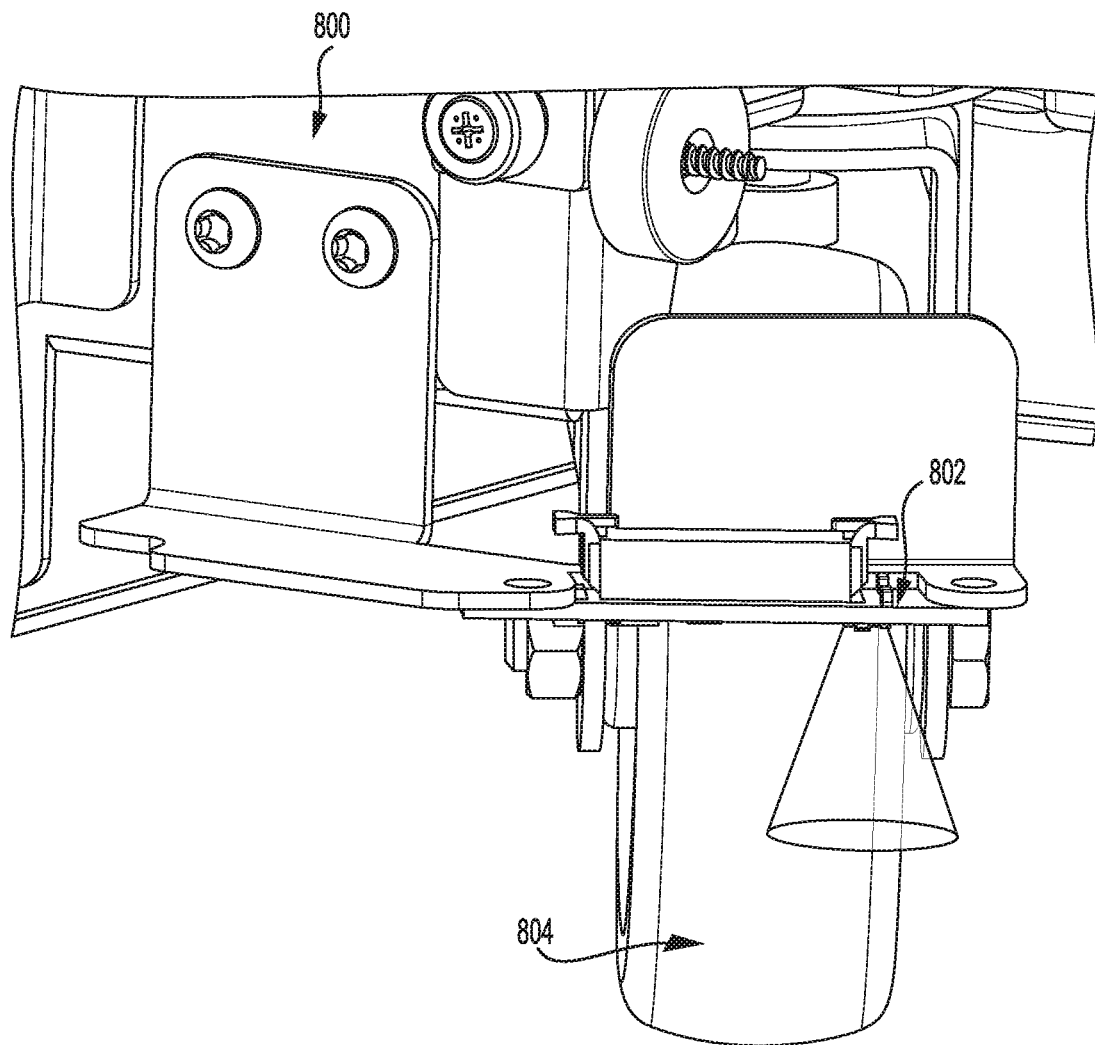
FIG. 8 illustrates a downward-facing 1D ToF sensor, in accordance with example embodiments.

FIG. 8 illustrates a downward-facing 1D ToF sensor, in accordance with example embodiments. More specifically, mobile base 800 includes a downward-facing 1D ToF sensor 802 positioned proximate to wheel 804. In some examples, the 1D ToF sensor may be oriented straight down. In other examples, the 1D ToF sensor may be oriented at a downward angle that is not directly perpendicular to the ground.

As illustrated in FIG. 8, the 1D ToF sensor 802 may be positioned so that its coverage region includes a portion of the ground surface behind wheel 804. Accordingly, the 1D ToF sensor may detect when the ground surface is no longer present at the expected height (indicating a cliff) before the robot associated with mobile base 800 backs up to a point where the wheel 804 crosses the cliff. In such a circumstance, the robot may be controlled to stop or change direction to avoid driving in a direction that would cause wheel 804 to go over a cliff, which may cause damage to the robot or require operator assistance. In some examples, detecting a cliff based on sensors data from a 1D ToF cliff sensor may involve detecting when the height of the ground surface changes by more than a threshold amount.

In some examples, multiple downward-facing 1D ToF sensors such as the one illustrated in FIG. 8 may be used for cliff detection. For instance, a separate cliff sensor may be positioned proximate to each rear wheel of the robot. In additional examples, downward-facing 1D ToF sensors may be positioned near the front of the robot and/or at other positions on the robot as well or instead. In general, 1D ToF sensors may provide a low cost solution for reliable cliff detection to assist with safe robotic navigation.

Figure 9:
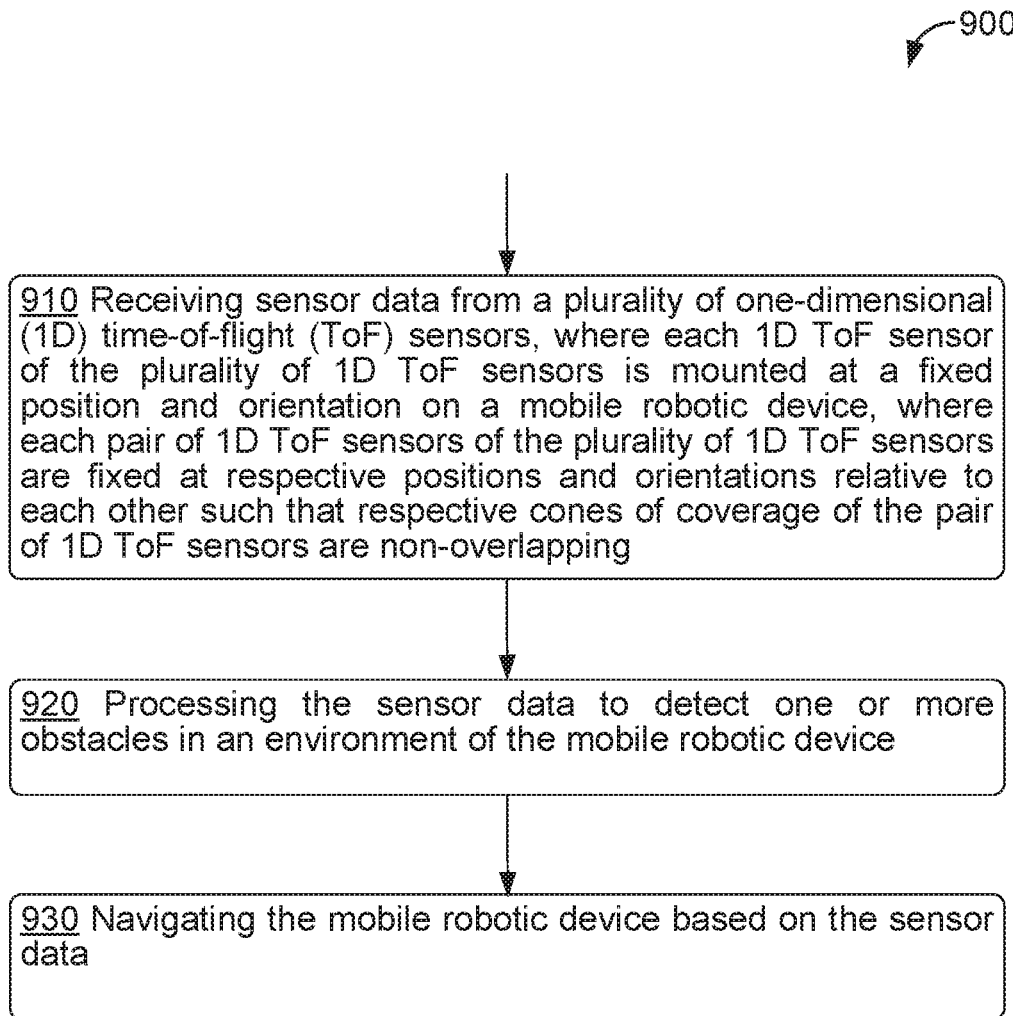
FIG. 9 is a block diagram of a method, in accordance with example embodiments.

FIG. 9 is a block diagram of a method, in accordance with example embodiments.

In some examples, method 900 of FIG. 9 may be carried out by a control system, such as control system 118 of robotic system 100. In further examples, method 900 may be carried by one or more processors, such as processor(s) 102, executing program instructions, such as program instructions 106, stored in a data storage, such as data storage 104. Execution of method 900 may involve a robotic device having one or more components such as illustrated and described with respect to FIGS. 1-4, 5A-5B, 6A-6B, 7, and 8. Other robotic devices may also be used in the performance of method 900. In further examples, some or all of the blocks of method 900 may be performed by a control system remote from the robotic device. In yet further examples, different blocks of method 900 may be performed by different control systems, located on and/or remote from a robotic device.

At block 902, method 900 includes receiving sensor data from a plurality of 1D ToF sensors. Each 1D ToF sensor of the plurality of 1D ToF sensors may be mounted at a fixed position and orientation on a mobile robotic device. Each pair of 1D ToF sensors of the plurality of 1D ToF sensors may be fixed at respective positions and orientations relative to each other such that respective cones of coverage of the pair of 1D ToF sensors are non-overlapping. In some examples, the plurality of 1D ToF sensors may be arranged along a common plane, such as a substantially horizontal plane. In other examples, a different arrangement of sensors may be used. In some examples, the plurality of 1D ToF sensors may include eight sensors. In other examples, a different number of sensors may be included.

In some examples, the respective cones of coverage of at least one pair of 1D ToF sensors have a respective pair of parallel cone edges. In further examples, at least one pair of 1D ToF sensors are oriented with an angle of separation approximately equal to a field of view of each of the 1D ToF sensors. In additional examples, the plurality of 1D ToF sensors are arranged along a common plane and have a total coverage area that includes substantially fixed-width negative lanes in between each pair of consecutive 1D ToF sensor cones. In some examples, each of the substantially fixed-width negative lanes has a same predetermined width (e.g., seven centimeters). In further examples, each of the substantially fixed-width negative lanes has a width that is between five and ten centimeters. In additional examples, a group of at least three ToF sensors may be arranged along a common plane, where each of the sensors is oriented with a same predetermined angle of separation from the previous sensor in the group.

At block 904, method 900 further includes processing the sensor data to detect one or more obstacles in an environment of the mobile robotic device. In some examples, the 1D ToF sensors may be divided into separate strips to allow for faster processing of the sensor data. In particular, the 1D ToF sensors may each be arranged on one of two strips. The mobile robotic device may include at least one processor configured to pull data from 1D ToF sensors on the two strips in parallel. Each of the two strips may be symmetric. In some examples, each of the two strips may further include at least one downward-facing 1D ToF sensor for cliff detection. Sensor data from the cliff sensors may be used to detect cliffs in the environment of the mobile robotic device.

At block 906, method 900 further includes navigating the mobile robotic device based on the sensor data. For instance, when the sensor data from a 1D ToF sensor indicates an unexpected obstacle in the environment, the robotic device may be controlled to stop or change direction to avoid a collision with the unexpected obstacle. In further examples, where sensor data from a cliff sensor indicates an unexpected cliff in the environment, the robotic device may be controlled to stop or change direction to avoid falling off the cliff. In some examples, a navigation adjustment may be made immediately in response to a detection from a 1D ToF sensor. In additional examples, detected obstacles and/or cliffs may be used to help build a map of the environment. In such examples, the map of the environment may subsequently be used to adjust navigation of the mobile robotic device at a later point in time.

III. Conclusion

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software or hardware modules in the same physical device. However, other information transmissions may be between software modules or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method for controlling navigation of a mobile robotic device, the method comprising:
    causing the mobile robotic device to travel on a current direction of travel;
    detecting, using at least one dimensional (1D) time-of-flight (ToF) sensor oriented at a downward angle on the mobile robotic device, that a change in a height of a ground surface exceeds a threshold amount;
    based on detecting that the change in the height of the ground surface exceeds the threshold amount, stopping the mobile robotic device from traveling on the current direction of travel;
    determining a new direction of travel for the mobile robotic device;
    causing the mobile robotic device to travel in the new direction of travel; and
    based on a rate at which sensor data is pulled from the at least one 1D ToF sensor, determining a maximum velocity for the mobile robotic device.

2. The method of claim 1, wherein the maximum velocity is a maximum reverse velocity.

3. The method of claim 1, further comprising:
determining, using the at least one 1D ToF sensor, an expected height of the ground surface from the at least one 1D ToF sensor;
determining, using the at least one 1D ToF sensor, a real-time height of the ground surface from the at least one 1D ToF sensor; and
determining, using the real-time height and the expected height, the change in the height.

4. The method of claim 1, wherein the at least one 1D ToF sensor is positioned at the rear of the mobile robotic device.

5. The method of claim 1, wherein the downward angle is substantially ninety degrees, such that the at least one 1D ToF sensor is oriented substantially perpendicular to the ground surface.

6. The method of claim 1, wherein the at least one 1D ToF sensor is positioned proximate to a wheel of the mobile robotic device.

7. The method of claim 1, wherein the at least one 1D ToF sensor is mounted on a strip, the strip comprising a plurality of 1D ToF sensors oriented substantially horizontal to the ground surface for obstacle detection.

8. A mobile robotic device, comprising:
at least one one dimensional (1D) time-of-flight (ToF) sensor positioned proximate to a wheel of the mobile robotic device, wherein the at least one 1D ToF sensor is oriented at a downward angle such that a coverage region includes a portion of a ground surface behind the wheel, wherein the at least one 1D ToF sensor is mounted on a strip, the strip comprising a plurality of 1D ToF sensors oriented substantially horizontal to the ground surface for obstacle detection;
one or more processors; and
a non-transitory computer readable medium comprising program instructions executable by the one or more processors to perform operations comprising:
causing the mobile robotic device to travel on a current direction of travel;
detecting, using the at least one 1D ToF sensor, that a change in a height of the ground surface exceeds a threshold amount;
based on detecting that the change in the height of the ground surface exceeds the threshold amount, stopping the mobile robotic device from traveling on the current direction of travel;
determining a new direction of travel for the mobile robotic device; and
causing the mobile robotic device to travel in the new direction of travel.

9. The mobile robotic device of claim 8, wherein the downward angle is substantially ninety degrees, such that the at least one 1D ToF sensor is oriented substantially perpendicular to the ground surface.

10. The mobile robotic device of claim 8, wherein the wheel is a first rear wheel and the mobile robotic device further comprises:
a second 1D ToF sensor positioned proximate to a second rear wheel of the mobile robotic device, wherein the second 1D ToF sensor is oriented at a downward angle such that a coverage region includes a portion of a ground surface behind the second rear wheel.

11. The mobile robotic device of claim 8, further comprising:
at least one 1D ToF sensor positioned proximate to a front of the mobile robotic device, wherein the at least one 1D ToF sensor is oriented at a downward angle such that a coverage region includes a portion of a ground surface in front of the mobile robotic device.

12. The mobile robotic device of claim 11, wherein the downward angle is substantially ninety degrees, such that the at least one 1D ToF sensor is oriented substantially perpendicular to the ground surface.

13. The mobile robotic device of claim 8, wherein the at least one 1D ToF sensor is positioned on a mobile base of the mobile robotic device.

14. The mobile robotic device of claim 8, further comprising a pass-through material positioned in front of the at least one 1D ToF sensor.

15. A non-transitory computer readable medium comprising program instructions executable by one or more processors to perform operations comprising:
causing a mobile robotic device to travel on a current direction of travel;
detecting, using at least one dimensional (1D) time-of-flight (ToF) sensor oriented at a downward angle on the mobile robotic device, that a change in a height of a ground surface exceeds a threshold amount;
based on detecting that the change in the height of the ground surface exceeds the threshold amount, stopping the mobile robotic device from traveling on the current direction of travel;
determining a new direction of travel for the mobile robotic device;
causing the mobile robotic device to travel in the new direction of travel; and
based on a rate at which sensor data is pulled from the at least one 1D ToF sensor, determining a maximum velocity for the mobile robotic device.

16. The non-transitory computer readable medium of claim 15, wherein the maximum velocity is a maximum reverse velocity.

17. The non-transitory computer readable medium of claim 15, the operations further comprising:
determining, using the at least one 1D ToF sensor, an expected height of the ground surface from the at least one 1D ToF sensor;
determining, using the at least one 1D ToF sensor, a real-time height of the ground surface from the at least one 1D ToF sensor; and
determining, using the real-time height and the expected height, the change in the height.

* * * * *